US009990938B2

(12) United States Patent
Sehlstedt

(10) Patent No.: US 9,990,938 B2
(45) Date of Patent: *Jun. 5, 2018

(54) DETECTOR AND METHOD FOR VOICE ACTIVITY DETECTION

(71) Applicant: Telefonaktiebolaget LM Ericsson (publ), Stockholm (SE)

(72) Inventor: Martin Sehlstedt, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days. days.

This patent is subject to a terminal disclaimer.

(21) Appl. No.: 15/680,432

(22) Filed: Aug. 18, 2017

(65) Prior Publication Data

US 2017/0345446 A1 Nov. 30, 2017

Related U.S. Application Data

(63) Continuation of application No. 13/121,305, filed as application No. PCT/SE2010/051118 on Oct. 18, 2010, now Pat. No. 9,773,511.

(60) Provisional application No. 61/376,815, filed on Aug. 25, 2010, provisional application No. 61/262,583, filed on Nov. 19, 2009, provisional application No. 61/252,858, filed on Oct. 19, 2009, provisional application No. 61/252,966, filed on Oct. 19, 2009.

(51) Int. Cl.

| | |
|---|---|
| ***G10L 21/04*** | (2013.01) |
| ***G10L 25/78*** | (2013.01) |
| *G10L 15/04* | (2013.01) |
| *H04R 3/02* | (2006.01) |
| *H04B 15/04* | (2006.01) |
| *H04L 12/66* | (2006.01) |

(52) U.S. Cl.
CPC .................................... *G10L 25/78* (2013.01)

(58) Field of Classification Search
None
See application file for complete search history.

(56) References Cited

U.S. PATENT DOCUMENTS

| | | | |
|---|---|---|---|
| 4,167,653 A | 9/1979 | Araseki et al. | |
| 4,891,824 A * | 1/1990 | Takamura | H03L 7/095 375/351 |

(Continued)

FOREIGN PATENT DOCUMENTS

| | | |
|---|---|---|
| EP | 0548054 A2 | 6/1993 |
| EP | 1265224 A1 | 12/2002 |

(Continued)

*Primary Examiner* — Neeraj Sharma
(74) *Attorney, Agent, or Firm* — Coats & Bennett, PLLC

(57) ABSTRACT

A signal activity detector (SAD) receives, from a hangover addition unit of a different SAD, a final decision signal of the different SAD. The final decision signal indicates a final decision of the different SAD as to whether or not the different SAD detects activity in a received input signal. The SAD combines the final decision signal of the different SAD with a preliminary decision signal of the SAD and sends a result of the combining to a hangover addition unit of the SAD. The preliminary decision signal of the SAD indicates a preliminary decision of the SAD as to whether or not the SAD detects activity in the input signal. The hangover addition unit of the SAD generates a final decision signal of the SAD based on the result of the combining.

19 Claims, 7 Drawing Sheets

(56) References Cited

U.S. PATENT DOCUMENTS

| | | | | |
|---|---|---|---|---|
| 5,473,702 | A | 12/1995 | Yoshida et al. | |
| 6,424,938 | B1 | 7/2002 | Johansson et al. | |
| 7,440,891 | B1 | 10/2008 | Shozakai | |
| 7,761,294 | B2 | 7/2010 | Kim | |
| 2002/0064139 | A1* | 5/2002 | Bist | H04B 3/23 370/289 |
| 2002/0075856 | A1 | 6/2002 | LeBlanc | |
| 2002/0116187 | A1 | 8/2002 | Erten | |
| 2003/0053639 | A1 | 3/2003 | Beaucoup et al. | |
| 2003/0228023 | A1 | 12/2003 | Burnett et al. | |
| 2005/0038651 | A1* | 2/2005 | Zhang | G10L 25/78 704/233 |
| 2005/0123033 | A1* | 6/2005 | Pessoa | H03H 21/0012 375/232 |
| 2006/0053007 | A1 | 3/2006 | Niemisto | |
| 2006/0224381 | A1 | 10/2006 | Makinen | |
| 2006/0271363 | A1* | 11/2006 | Murashima | G10L 25/78 704/233 |
| 2007/0094018 | A1 | 4/2007 | Zinser, Jr. et al. | |
| 2008/0040109 | A1 | 2/2008 | Muralidhar et al. | |
| 2009/0046847 | A1* | 2/2009 | Wu | H04M 9/082 379/406.01 |
| 2009/0089053 | A1 | 4/2009 | Wang et al. | |
| 2009/0192803 | A1* | 7/2009 | Nagaraja | G10L 19/012 704/278 |
| 2009/0222264 | A1 | 9/2009 | Pilati et al. | |
| 2010/0017205 | A1 | 1/2010 | Visser et al. | |
| 2010/0121634 | A1 | 5/2010 | Muesch | |
| 2010/0268532 | A1 | 10/2010 | Arakawa et al. | |
| 2010/0280827 | A1* | 11/2010 | Mukerjee | G10L 15/142 704/236 |
| 2011/0066429 | A1 | 3/2011 | Shperling et al. | |
| 2011/0106533 | A1 | 5/2011 | Yu | |

FOREIGN PATENT DOCUMENTS

| | | | |
|---|---|---|---|
| GB | 2430129 | A | 3/2007 |
| JP | 2002540441 | A | 11/2002 |
| WO | 2007030190 | A1 | 3/2007 |
| WO | 2007091956 | A2 | 8/2007 |
| WO | 2008143569 | A1 | 11/2008 |
| WO | 2009069662 | A1 | 6/2009 |

* cited by examiner

DETECTOR AND METHOD FOR VOICE ACTIVITY DETECTION

The present application is a continuation of prior U.S. patent application Ser. No. 13/121,305 filed on 28 Mar. 2011, which was the U.S. National Stage of International Application No. PCT/SE2010/051118 filed on 18 Oct. 2010, which claims the benefit of U.S. Provisional Application Ser. No. 61/376,815 filed on 25 Aug. 2010, and the benefit of U.S. Provisional Application Ser. No. 61/262,583 filed on 19 Nov. 2009, and the benefit of U.S. Provisional Application Ser. No 61/252,966 filed on 19 Oct. 2009, and the benefit of U.S. Provisional Application Ser. No 61/252,858 filed 19 Oct. 2009, the disclosures of all of which are each expressly incorporated by reference herein in its entirety.

TECHNICAL FIELD

The present invention relates to a method and a voice activity detector and in particular to an improved voice activity detector for handling e.g. non stationary background noise.

BACKGROUND

In speech coding systems used for conversational speech it is common to use discontinuous transmission (DTX) to increase the efficiency of the encoding. The reason is that conversational speech contains large amounts of pauses embedded in the speech, e.g. while one person is talking the other one is listening. So with DTX the speech encoder is only active about 50 percent of the time on average and the rest can be encoded using comfort noise. Some example codecs that have this feature are the AMR NB (Adaptive MultiRate Narrowband).

For high quality DTX operation, i.e. without degraded speech quality, it is important to detect the periods of speech in the input signal this is done by the Voice Activity Detector (VAD). FIG. 1 shows an overview block diagram of a generalized VAD 180, which takes the input signal 100, divided into data frames, 5-30 ms depending on the implementation, as input and produces VAD decisions as output 160. I.e. a VAD decision 160 is a decision for each frame whether the frame contains speech or noise).

The generic VAD 180 comprises a background estimator 130 which provides subband energy estimates and a feature extractor 120 providing the feature subband energy. For each frame, the generic VAD calculates features and to identify active frames the feature(s) for the current frame are compared with an estimate of how the feature "looks" for the background signal.

The primary decision, "vad_prim" 150, is made by a primary voice activity detector 140 and is basically just a comparison of the features for the current frame and the background features (estimated from previous input frames), where a difference larger than a threshold causes an active primary decision. The hangover addition block 170 is used to extend the VAD decision from the primary VAD based on past primary decisions to form the final VAD decision, "vad_flag" 160, i.e. older VAD decisions are also taken into account. The reason for using hangover is mainly to reduce/remove the risk of mid speech and backend clipping of speech bursts. However, the hangover can also be used to avoid clipping in music passages. An operation controller 110 may adjust the threshold(s) for the primary detector and the length of the hangover addition according to the characteristics of the input signal.

There are a number of different features that can be used for VAD detection, one feature is to look just at the frame energy and compare this with a threshold to decide if the frame comprises speech or not. This scheme works reasonably well for conditions where the SNR is good but not for low SNR cases. In low SNR it is instead required to use other metrics comparing the characteristics of the speech and noise signals. For real-time implementations an additional requirement of VAD functionality is computational complexity and this is reflected in the frequent representation of subband SNR VADs in standard codecs e.g. AMR NB, AMR WB (Adaptive Multi-Rate WdeBand) and G.718 (ITU-T recommendation embedded scalable speech and audio codec).

While the subband SNR based VAD combines the SNR's of the different subbands to a metric which is compared to a threshold for the primary decision. In the subband based VAD, the SNR is determined for each subband and a combined SNR is determined based on those SN Rs. The combined SNR, may be a sum of all SNRs on different subbands. There are also known solutions where multiple features with different characteristics are used for the primary decision. However, in both cases there is just one primary decision that is used for adding hangover, which may be adaptive to the input signal conditions, to form the final decision. Also many VAD's have an input energy threshold for silence detection, i.e. for input levels that are low enough, the primary decision is forced to the inactive state.

For VADs based on subband SNR principle it has been shown that the introduction of a non-linearity in the subband SNR calculation, called significance thresholds, can improve VAD performance for conditions with non-stationary noise (babble, office).

Non-stationary noise can be difficult for all VADs, especially under low SNR conditions, which results in a higher VAD activity compared to the actual speech and reduced capacity from a system perspective. Of the non-stationary noise the most difficult is babble noise and the reason is that its characteristics are relatively close to the speech signal the VAD is designed to detect. Babble noise is usually characterized both by the SNR relative to the speech level of the foreground speaker and the number of background talkers, where a common definition (as used in subjective evaluations) is that babble should have 40 or more background speakers, the basic motivation being that for babble it should not be possible to follow any of the included speakers in the babble noise (non of the babble speakers shall become intelligible). It should also be noted that with an increasing number of talkers in the babble noise it becomes more stationary. With only one (or a few) speaker(s) in the background they are usually called interfering talker(s). A further problematic issue is that babble noise may have spectral variation characteristics very similar to some music pieces that the VAD algorithm shall not suppress.

In the previously mentioned VAD solutions AMR NB/WB and G.718 there are varying degrees of problem with babble noise in some cases already at reasonable SNRs (20 dB). The result is that the assumed capacity gain from using DTX can not be realized. In real mobile phone systems it has also been noted that it may not be enough to require reasonable DTX operation in 15-20 dB SNR. If possible one would desire reasonable DTX operation down to 5 dB even 0 dB depending on the noise type. For low frequency background noise an SNR gain of 10-15 dB can be achieved for the VAD functionality just by highpass filtering the signal before VAD analysis. Due to the similarity of babble to speech the gain from highpass filtering the input signal is very low.

From a quality point of view it is better to use a failsafe VAD, meaning that when in doubt it is better for the VAD to signal speech input and just allow for a large amount of extra activity. This may, from a system capacity point view, be acceptable as long as only a few of the users are in situations with non-stationary background noise. However, with an increasing number of users in non-stationary environments the usage of failsafe VAD may cause significant loss of system capacity. It is therefore becoming important to work on pushing the boundary between failsafe and normal VAD operation so that a larger class of non-stationary environments are handled using normal VAD operation.

Though the usage of significance thresholds which improves VAD performance it has been noted that it may also cause occasional speech clippings, mainly front end clippings of low SNR unvoiced sounds.

For existing solutions when a new problem area is identified it can be difficult to find a new tuning of an existing VAD that does not change the behavior of the VAD for already working conditions. That is, while it would be possible to change the tuning to cope with the new problem, it may not be possible to make the tuning without changing the behavior in already known conditions.

SUMMARY

The embodiments of the present invention provides a solution for retuning existing VAD's to handle non-stationary backgrounds or other discovered problem areas.

Thus by allowing multiple VAD's to work in parallel and then combine the outputs, it is possible to exploit the strengths from the different VAD's without suffering too much from each VAD's limitations.

In one embodiment to be used in situations when one wants to reduce excessive activity, the primary decision of the first VAD is combined with a final decision from an external VAD by a logical AND. The external VAD is preferably more aggressive than the first VAD. An aggressive VAD implies a VAD which is tuned/constructed to generate lower activity compared to a "normal" VAD. The main purpose of an aggressive VAD is that it should reduce the amount of excessive activity compared to a normal/original VAD. Note that this aggressiveness only may apply to some particular (or limited number of) condition(s) e.g. concerning noise types or SNR's.

Another embodiment can be used in situations when one wants to add activity without causing excessive activity, the primary decision of the first VAD may in this embodiment be combined with a primary decision from an external VAD by a logical OR.

Thus according to a first aspect of embodiments of the present invention a method in a voice activity detector (VAD) for detecting voice activity in a received input signal is provided. In the method, a signal is received from a primary voice detector of said VAD indicative of a primary VAD decision and at least one signal is received from at least one external VAD indicative of a voice activity decision from the at least one external VAD. The voice activity decisions indicated in the received signals are combined to generate a modified primary VAD decision, and the modified primary VAD decision is sent to a hangover addition unit of said VAD.

According to a second aspect of embodiments of the present invention, a voice activity detector (VAD) is provided. The VAD is configured to detect voice activity in a received input signal comprising an input section configured to receive a signal from a primary voice detector of said VAD indicative of a primary VAD decision and at least one signal from at least one external VAD indicative of a voice activity decision from the at least one external VAD. The VAD further comprises a processor configured to combine the voice activity decisions indicated in the received signals to generate a modified primary VAD decision and an output section configured to send the modified primary VAD decision to a hangover addition unit of said VAD.

By combining an existing VAD with one or more external VAD's it is possible to improve overall VAD performance with only minor effect on internal states of the original VAD—which may be a requirement for other codec functions, e.g. frame classification and codec mode selection.

A further advantage with embodiments of the present invention is that the use of multiple VAD's does not affect normal operation, i.e. when the SNR of the input signal is good. It is only when the normal VAD function is not good enough that the external VAD should make it possible to extend the working range of the VAD.

If the external VAD works properly for the noise causing problems, the solution of an embodiment allows the external VAD to override the primary decision from the first VAD, i.e. preventing false activity on background noise only.

Further, addition of more external VADs makes it possible to reduce the amount of excessive activity or allow detection of additional previously clipped speech (or audio). Adaptation of the combination logic to the current input conditions may be needed to prevent that the external VAD's increase the excessive activity or introduce additional speech clipping. The adaptation of the combination logic could be such that the external VAD's are only used during input conditions (noise level, SNR, or nose characteristics [stationary/non-stationary]) where it has been identified that the normal VAD is not working properly.

DETAILED DESCRIPTION

Figure 1:
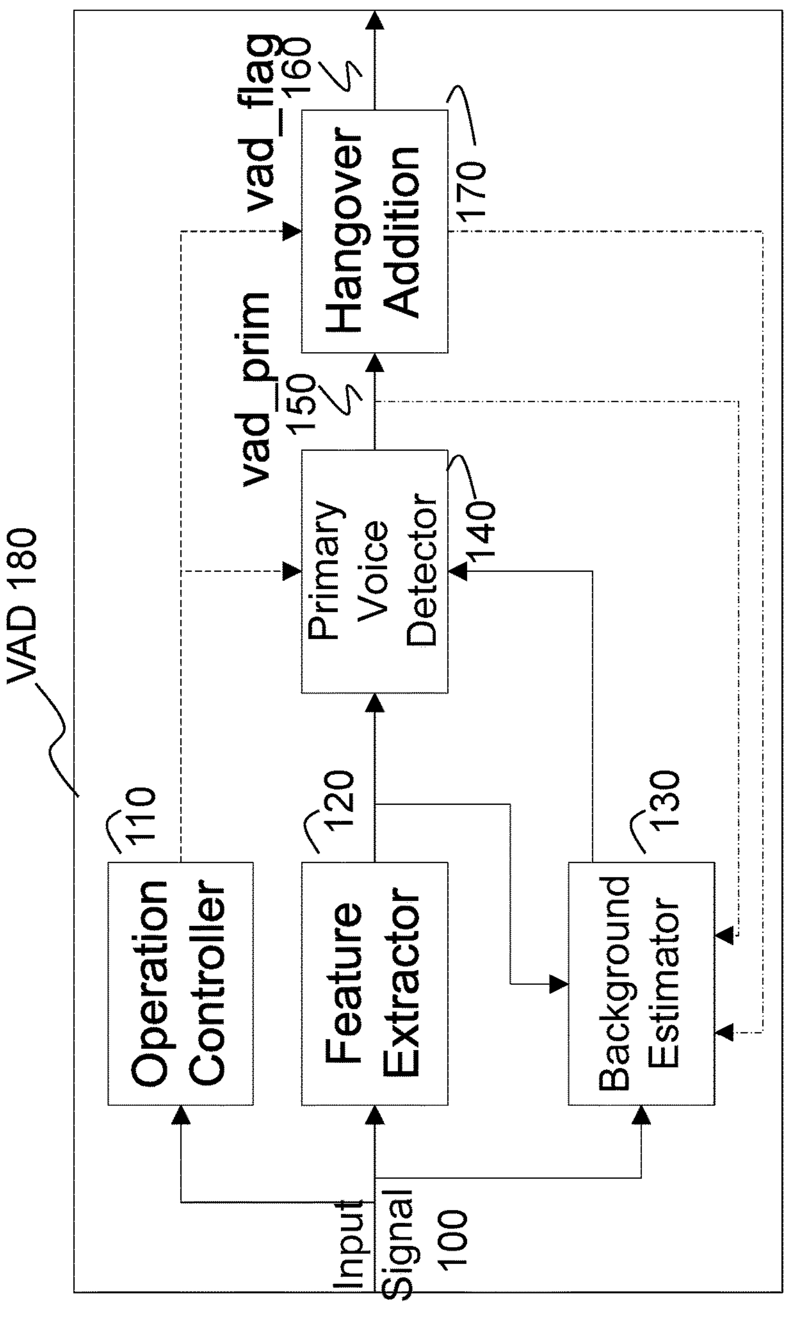
PRIOR ART FIG. 1
FIG. 1 shows a generic VAD with background estimation according to prior art.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

Figure 2:
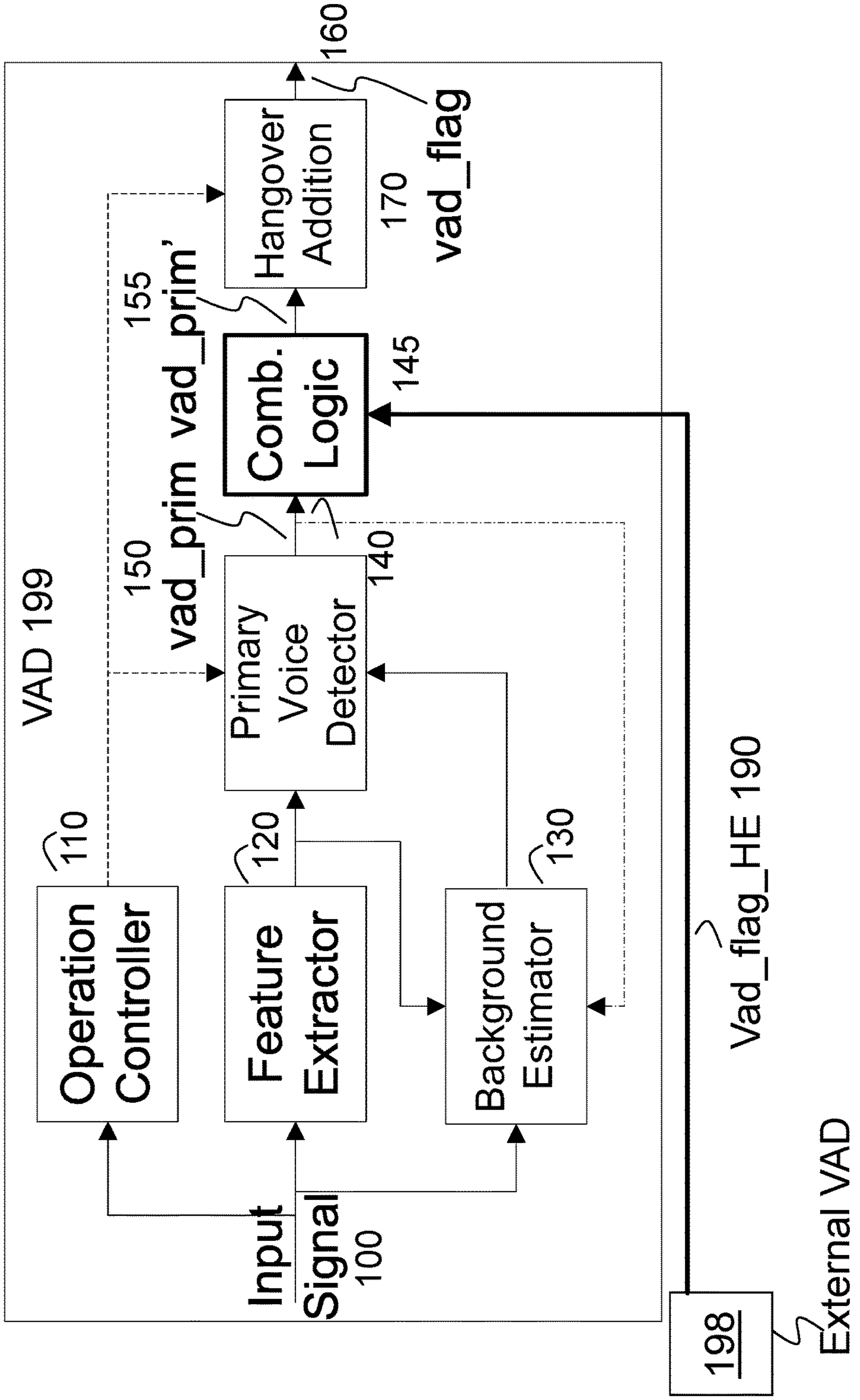
FIGS. 2-5 show generic VAD with background estimation including the multi VAD combination logic according to embodiments of the present invention.
Figure 3:
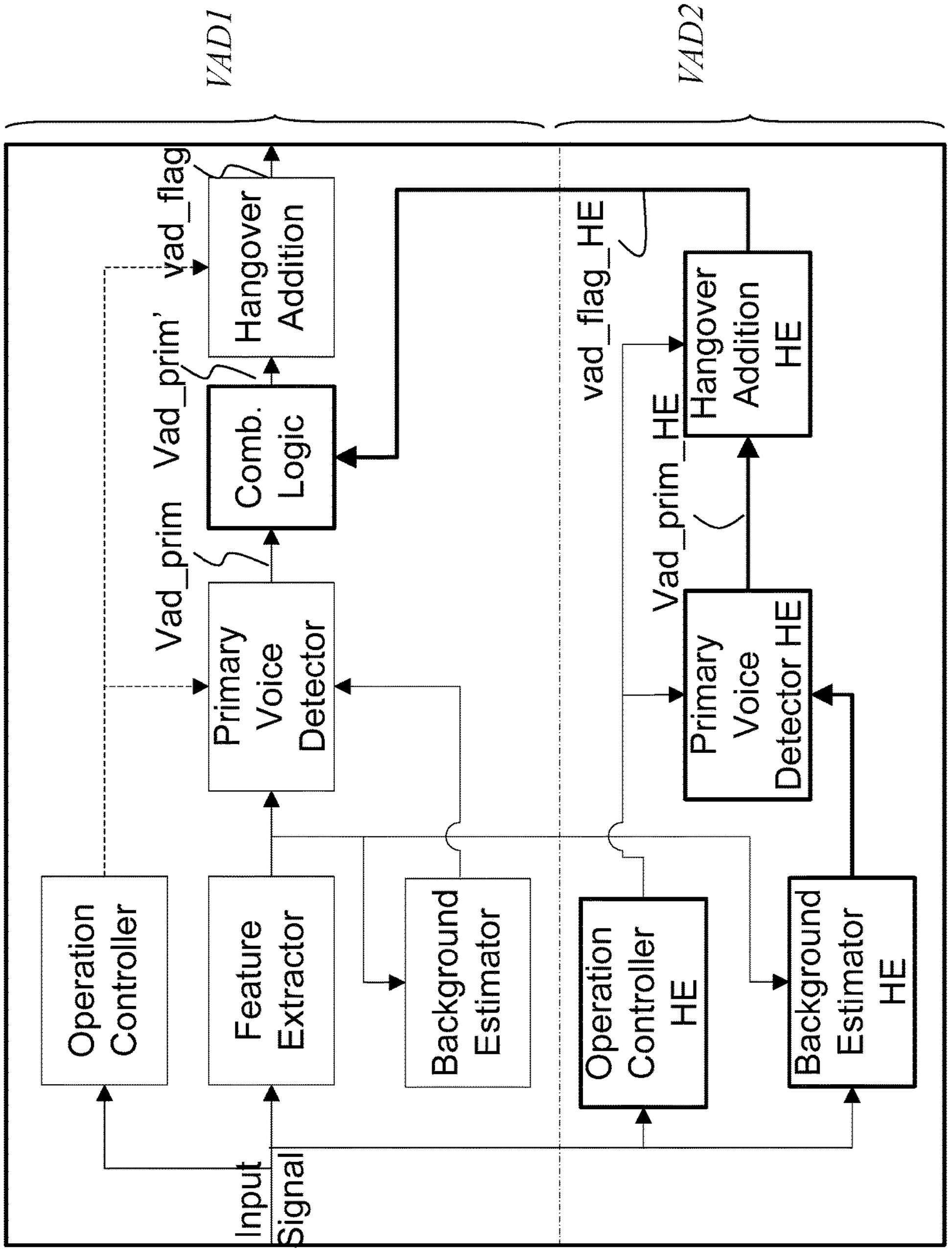

FIG. 2 shows a first VAD 199 with background estimation as in FIG. 1. A difference is that the VAD further comprises a combination logic 145 according to a first embodiment of the present invention. In this embodiment, the performance of the first VAD is improved with the introduction of an external vad_flag_HE 190 from an external VAD 198 to the combination logic 145 which is introduced before the hangover addition 170. It should be noted that the way the external VAD 198 is used will not affect the primary voice activity detector 140 and the normal behaviour of the VAD during good SNR conditions. By forming the new primary decision referred to as vad_prim' 155 in the combination logic 145 through a logical AND between the primary decision vad_prim from the first VAD and the final decision referred to as vad_flag_he 190 from the external VAD 198, this results in that excessive activity of the VAD can be avoided. The first embodiment is also shown in FIG. 3 which also schematically illustrates the external VAD VAD2. FIG. 3 is further explained below.

With the external VAD according to the embodiments described above, it is possible to reduce the excessive activity for additional noise types. This is achieved as the external VAD can prevent false active signals from the original VAD. Excessive activity implies that the VAD indicates active speech for frames which only comprise background noise. This excessive activity is usually a result of 1) non-stationary speech like noise (babble) or 2) that the background noise estimation is not working properly due to non-stationary noise or other falsely detected speech like input signals.

According to a second embodiment, the combination logic forms a new primary decision referred to as vad_prim' through a logical OR between the primary decision vad_prim from the first VAD and the primary decision referred to as vad_prim_HE from the external VAD. In this way it is possible to add activity to correct undesired clipping performed by the first VAD.

Figure 4:
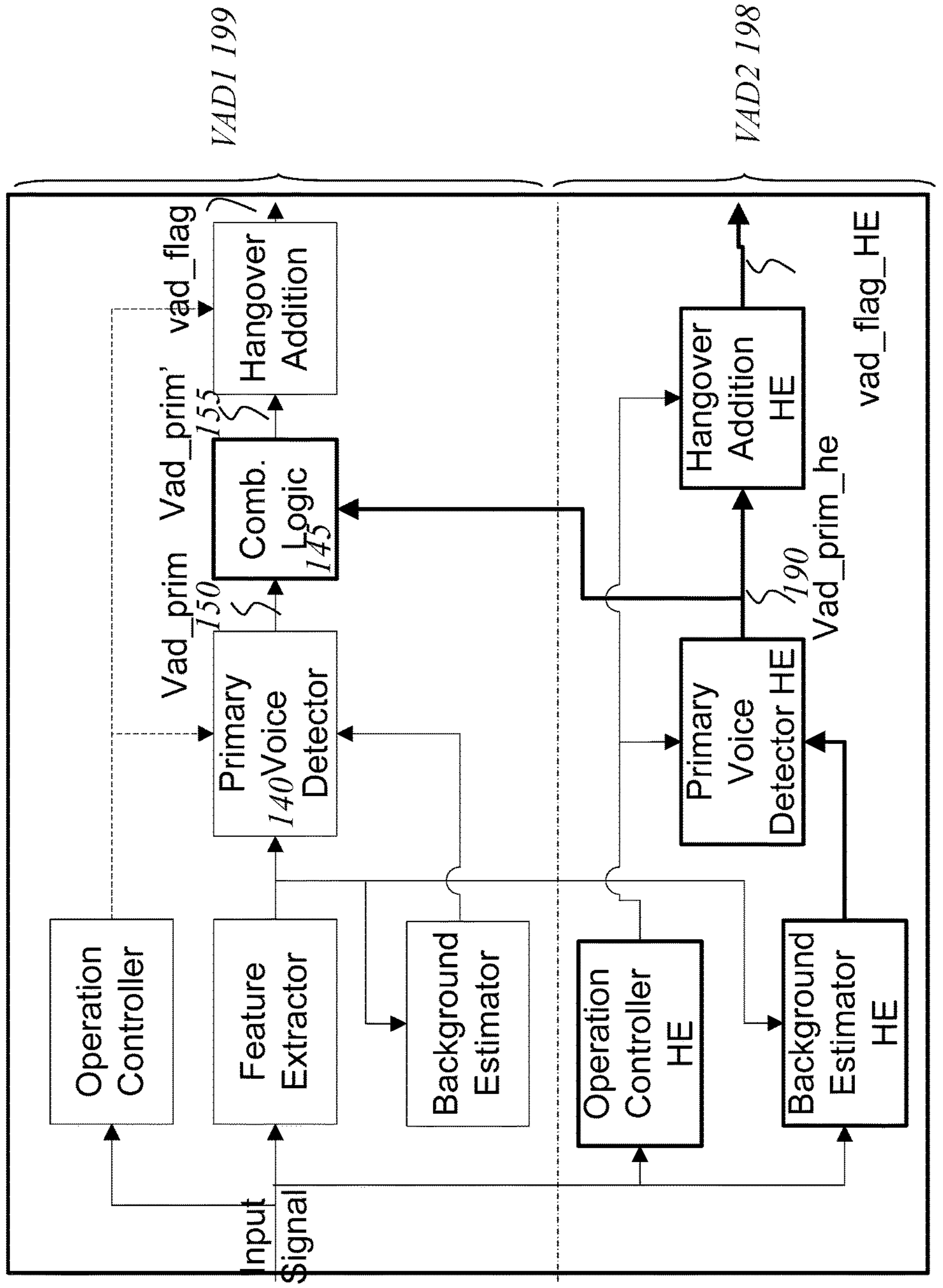

The second embodiment is illustrated in FIG. 4 which also shows the external VAD 198, the combination logic 145 forms a primary decision referred to as vad_prim' 155 through a logical OR between the primary decision vad_prim 150 of the primary VAD 140 of the first VAD 199 and the primary decision referred to as vad_prim_he 190 from the external VAD 198. This results in that the external VAD 198 can be used to avoid clipping caused by the first VAD 199. Hence, the external VAD 198 is able to correct errors caused by the first VAD 199, which implies that missed detected activity by the first VAD 199 can be detected by the external VAD 198. In order to avoid increasing excessive activity it is an advantage to use the primary decision of the external VAD.

Figure 5:
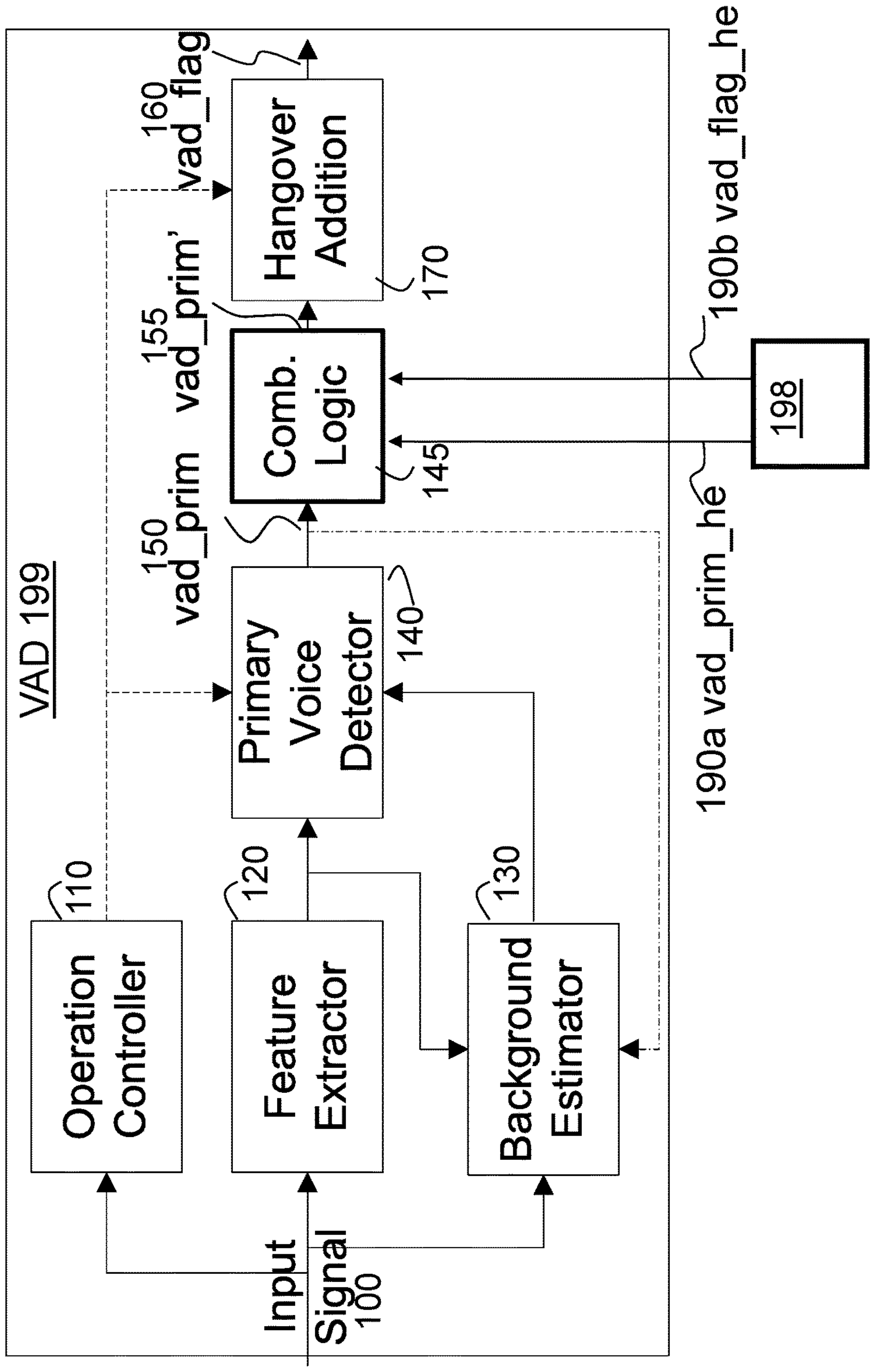

Turning now to FIG. 5, corresponding to FIG. 2 showing a third embodiment. In the third embodiment, the combination logic 145 forms a new primary decision referred to as vad_prim' 155 through a combination of the primary decision vad_prim 150 from the first VAD 140 and the final 190*b* and the primary decisions 190*a* from the external VAD. This is illustrated in FIG. 5. These three decisions may be combined by using any combination of AND and/or OR in the combination logic 145. As one example it is possible to use the primary decisions of the first and the external VADs to be combined with a logical OR before combining with the final decision of the external VAD by using a logical AND. Then it would be possible to also detect previously clipped segments.

According to a fourth embodiment VAD decisions from more than one external VAD are used by the combination logic to form that new Vad_prim'. The VAD decisions may be primary and/or final VAD decisions. If more than one external VAD is used, these external VADs can be combined prior to the combination with the first VAD. E.g. Vad_prim & (external_vad_1 & external_vad_2).

In this specification the primary decision of the VAD implies the decision made by the primary voice activity detector. This decision is referred to Vad_prim or local VAD. The final decision of the VAD implies the decision made by the VAD after the hangover addition. The combined logic according to embodiments of the present invention is introduced in a VAD and generates a Vad_prim' based on the Vad_prim of the VAD and an external VAD decision from an external VAD. The external VAD decision can be a primary decision and/or a final decision of one or more external VADs. The combined logic is configured to generate the Vad_prim' by applying a logic AND or logic OR on the Vad_prim of the first VAD and the VAD decision or VAD decisions from the external VAD(s).

Referring to FIGS. 3 and 4 which are block diagrams of the first VAD and the external VAD. The block diagrams show the two VAD's consisting of the original VAD (VAD 1) and the external VAD (VAD 2) with combination logic for generation of the improved vad_prim in the original VAD according to embodiments.

As indicated in FIGS. 3 and 4 the two VAD's share the feature extractor. The external VAD may use a modified background update and a primary voice activity detector. The modified background update comprises a modification in the background noise update strategy wherein the normal noise update deadlock recovery is slowed down and adds an alternative possibility for noise updates to allow the noise estimate to better track the noise. The modified primary voice activity detector may add significance threshold and an updated threshold adaptation based on energy variations of the input. These two modifications may be used in parallel.

To make a primary decision for the first VAD, referred to VAD 1 a variable SNR sum, snr_sum, is compared with a calculated threshold, thr1 in order to determine whether the input signal is active speech (localVAD=1 which corresponds to Vad_prim=1) or noise (localVAD=0 which corresponds to Vad_prim=0) in prior art as indicated below:

```
localVAD = 0;
if ( snr_sum > thr1 ) {
  localVAD = 1;
}
```

Using the combination logic according to embodiments of the present invention, a logical AND is applied on the localVAD from the first VAD and the final decision from the external VAD, referred to as vad_flag_he. That is, with the use of the combination logic the primary voice activity detector is only allowed to become active if both the localVAD from the first VAD and vad_flag_he from the external VAD are active. I.e.,

```
localVAD = 0;
if ( snr_sum > thr1 && vad_flag_he ) {
  localVAD = 1;
}
```

As the value of vad_flag_he is needed the code for the external VAD including its hangover addition needs to be executed before one can generate the modified VAD 1 decision.

In a fifth embodiment, the combination logic is configured to be signal adaptive, i.e. changing the combination logic depending on the current input signal properties. The combination logic could depend on the estimated SNR, e.g. it would be possible to use an even more aggressive second VAD if the combination logic is configured such that only the original VAD is used in good conditions. While for noisy conditions the aggressive VAD is used as in embodiment 1. With this adaptation the aggressive VAD could not introduces speech clippings in good SNR conditions, while in noisy conditions it is assumed that the clipped speech frames are masked by the noise.

One purpose of some embodiments of the present invention is to reduce the excessive activity for non-stationary background noises. This can be measured using objective measures by comparing the activity of mixtures encoded. However, this metric does not indicate when the reduction in activity starts affecting the speech, i.e. when speech frames are replaced with background noise. It should be noted that in speech with background noise not all speech frames will be audible. In some cases speech frames may actually be replaced with noise without introducing an audible degradation. For this reason it is also important to use subjective evaluation of some of the modified segments.

The objective results presented below are based on mixtures of speech with background noises under varying conditions, with respect to different speech samples in several languages for different noise environments and signal to noise ratios (SNR's).

Mixtures were created with different noise samples and with different SNR conditions. The noises were categorized as Exhibition noise, Office noise, and Lobby noise as representations for non-stationary background noises. Speech and noise files were mixed, with the speech level set to −26 dBov and four different SNR's in the range 10-30 dB.

The prepared samples were then processed both by using the codec with the original VAD according to prior art and with the codec using the combined VAD solution (denoted Dual VAD) according to embodiments of the present invention.

For the objective results the speech activity generated by the different codecs using the different VAD solutions are compared and the results can be found in the table below. Note that the activity figures in the table are measured for the complete sample which is 120 seconds each. A tool used for level adjustments of the speech clips indicated that the speech activity of the clean speech files was estimated to 21.9%.

TABLE

Summary of activity results: total, noise types, and SNR's

| Condition | Original | Dual VAD | Activity reduction |
|---|---|---|---|
| All noises/SNR's | 50.5 | 34.0 | 16.5 |
| Exhibition noise all SNR | 50.4 | 35.7 | 14.7 |
| Office noise all SNR | 67.1 | 41.7 | 25.4 |
| Lobby noise all SNR | 33.9 | 24.4 | 9.5 |
| 30 dB SNR | 29.3 | 23.4 | 5.9 |
| 20 dB SNR | 43.6 | 29.1 | 14.5 |
| 15 dB SNR | 58.5 | 37.3 | 21.2 |
| 10 dB SNR | 70.6 | 46.0 | 24.6 |

The results show that one embodiment of the present invention shown in FIG. 3, provides a reduction in activity.

Figure 7:
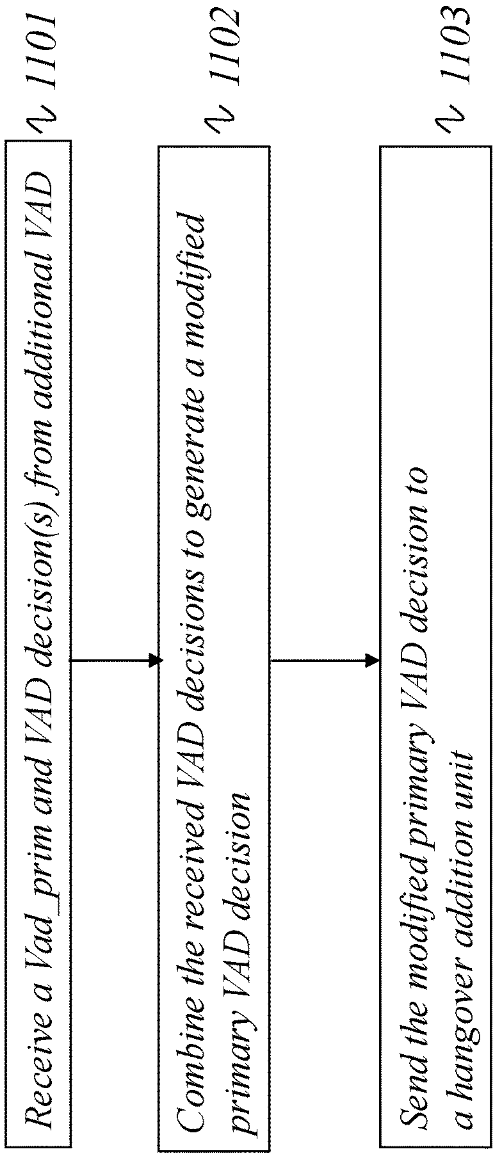
FIG. 7 is a flowchart of a method according to embodiments of the present invention.

According to one aspect of embodiments, a method in a combination logic of a VAD is provided as illustrated in the flowchart of FIG. 7. The VAD is configured to detect voice activity in a received input signal. A signal from a primary voice detector of said VAD indicative of a primary VAD decision and at least one signal from at least one external VAD indicative of a voice activity decision from the at least one external VAD are received 1101. The voice activity decisions indicated in the received signals are combined 1102 to generate a modified primary VAD decision. The modified primary VAD decision is sent 1103 to a hangover addition unit of said VAD to be used for making the final VAD decision.

The voice activity decisions in the received signals may be combined by a logical AND such that the modified primary VAD decision of said VAD indicates voice only if both the signal from the primary VAD and the signal from the at least one external VAD indicate voice.

Moreover, the voice activity decisions in the received signals may also be combined by a logical OR such that the modified primary VAD decision of said VAD indicates voice if at least one signal of the signal from the primary VAD and the signal from the at least one external VAD indicate voice.

The at least one signal from the at least one external VAD may indicate a voice activity decision from the external VAD which a final and/or primary VAD decision.

Figure 6:
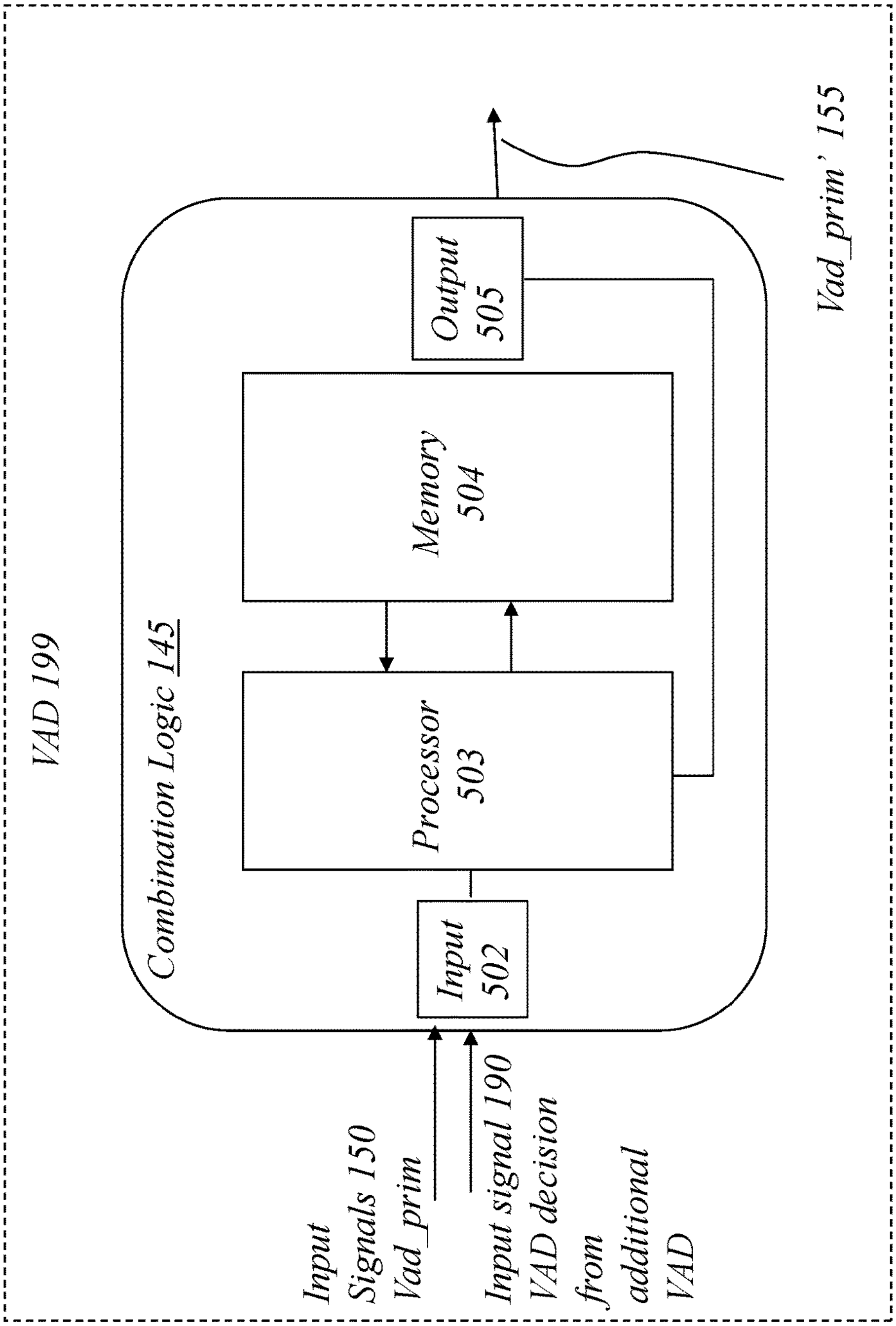
FIG. 6 discloses a combination logic according to embodiments of the present invention.

According to another aspect of embodiments, a VAD configured to detect voice activity in a received input signal is provided as illustrated in FIG. 6. The VAD comprises an input section 502 for receiving a signal 150 from a primary voice detector of said VAD indicative of a primary VAD decision and at least one signal 190 from at least one external VAD indicative of a voice activity decision from the at least one external VAD. The VAD further comprises a processor 503 for combining the voice activity decisions indicated in the received signals to generate a modified primary VAD decision, and an output section 505 for sending the modified primary VAD decision 155 to a hangover addition unit of said VAD. The VAD may further comprise a memory for storing history information and software code portions for performing the method of the embodiments. It should also be noted, as exemplified above, that the input section 502, the processor 503, the memory 504 and the output section 505 may be embodied in a combination logic 145 in the VAD.

According to an embodiment, the processor 503 is configured to combine voice activity decisions in the received signals by a logical AND such that the modified primary VAD decision of said VAD indicates voice only if both the signal from the primary VAD and the signal from the at least one external VAD indicate voice.

According to a further embodiment, the processor 503 is configured to combine voice activity decisions in the received signals by a logical OR such that the modified primary VAD decision of said VAD indicates voice if at least one signal of the signal from the primary VAD and the signal from the at least one external VAD indicate voice.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, implemented in a signal activity detector (SAD), for detecting activity in a received input signal, the method comprising:

receiving, from a hangover addition circuit of a different SAD, a final decision signal of the different SAD, the final decision signal indicating a final decision of the different SAD as to whether or not the different SAD detects activity in the input signal;

combining the final decision signal of the different SAD with a preliminary decision signal of the SAD and one or both of:

a preliminary decision signal of the different SAD indicating a preliminary decision of the different SAD as to whether or not the different SAD detects activity in the input signal without the hangover addition circuit of the different SAD; or a decision signal of one or more further SADs, each further SAD being distinct from the SAD and the different SAD, and each decision signal indicating a decision of the corresponding further SAD as to whether or not the corresponding further SAD detects activity in the input signal;

wherein the preliminary decision signal of the SAD indicates a preliminary decision of the SAD as to whether or not the SAD detects activity in the input signal;

sending a result of the combining to a hangover addition circuit of the SAD;

generating, by the hangover addition circuit of the SAD, a final decision signal of the SAD based on the result of the combining.

2. The method of claim 1, wherein the combining comprises combining by a logical AND of the final decision signal of the different SAD and preliminary decision signal of the SAD.

3. The method of claim 1, wherein the combining comprises combining by a logical OR of the final decision signal of the different SAD and preliminary decision signal of the SAD.

4. The method of claim 1, wherein the combining comprises combining the final decision signal of the different SAD with the preliminary decision signal of the SAD and the preliminary decision signal of the different SAD.

5. The method of claim 1, wherein the combining comprises combining the final decision signal of the different SAD with the preliminary decision signal of the SAD and the decision signal of the one or more further SADs.

6. The method of claim 1, further comprising sending the input signal to the different SAD and receiving the final decision signal of the different SAD from the hangover addition circuit of the different SAD in response.

7. The method of claim 1, further comprising selecting a combination logic for the combining based on properties of the input signal.

8. The method of claim 1, wherein the preliminary decision signal of the SAD falsely indicates activity in the input signal under a given noise condition, and the combining modifies the preliminary decision signal such that the result of the combining corrects the false indication of the preliminary decision signal under the given noise condition.

9. The method of claim 1, wherein the combining comprises combining the preliminary decision signal of the SAD with the preliminary decision signal of the different SAD using a first combination logic to produce a preliminary result, and combining the preliminary result with the final decision signal of the different SAD using a second combination logic that is different from the first combination logic.

10. A signal activity detector (SAD) for detecting activity in a received input signal, the SAD comprising:

a processor circuit and a memory, the memory containing instructions executable by the processor circuit whereby the processor circuit is configured to:

receive, from a hangover addition unit of a different SAD, a final decision signal of the different SAD, the final decision signal indicating a final decision of the different SAD as to whether or not the different SAD detects activity in the input signal;

combine the final decision signal of the different SAD with a preliminary decision signal of the SAD and one or both of:

a preliminary decision signal of the different SAD indicating a preliminary decision of the different SAD as to whether or not the different SAD detects activity in the input signal without the hangover addition circuit of the different SAD; or a decision signal of one or more further SADs, each further SAD being distinct from the SAD and the different SAD, and each decision signal indicating a decision of the corresponding further SAD as to whether or not the corresponding further SAD detects activity in the input signal;

send a result of the combining to a hangover addition unit of the SAD, the preliminary decision signal of the SAD indicating a preliminary decision of the SAD as to whether or not the SAD detects activity in the input signal;

generate, using the hangover addition unit of the SAD, a final decision signal of the SAD based on the result of the combining.

11. The SAD of claim 10, wherein the processor circuit is configured to combine using a logical AND of the final decision signal of the different SAD and preliminary decision signal of the SAD.

12. The SAD of claim 10, wherein the processing circuit is configured to combine using a logical OR of the final decision signal of the different SAD and preliminary decision signal of the SAD.

13. The SAD of claim 10, wherein the processing circuit is configured to combine the final decision signal of the different SAD with the preliminary decision signal of the SAD and the preliminary decision signal of the different SAD.

14. The SAD of claim 10, wherein the processing circuit is configured to combine the final decision signal of the different SAD with the preliminary decision signal of the SAD and the decision signal of the one or more further SADs.

15. The SAD of claim 10, wherein the processor circuit is further configured to send the input signal to the different SAD and receive the final decision signal of the different SAD from the hangover addition unit of the different SAD in response.

16. The SAD of claim 10, wherein the processor circuit is further configured to select a combination logic for the combining based on properties of the input signal.

17. The SAD of claim 10, wherein the preliminary decision signal of the SAD falsely indicates activity in the input signal under a given noise condition, and to combine, the processor circuit is configured to modify the preliminary decision signal such that the result of the combining corrects the false indication of the preliminary decision signal under the given noise condition.

18. The SAD of claim 10, wherein the processor circuit is configured to combine the preliminary decision signal of the SAD with the preliminary decision signal of the different SAD using a first combination logic to produce a preliminary result, and combine the preliminary result with the final decision signal of the different SAD using a second combination logic that is different from the first combination logic.

19. A non-transitory computer readable medium storing a computer program product for controlling a signal activity detector (SAD), the computer program product comprising software instructions that, when run on a programmable processor circuit of the SAD, cause the SAD to:

receive, from a hangover addition unit of a different SAD, a final decision signal of the different SAD, the final decision signal indicating a final decision of the different SAD as to whether or not the different SAD detects activity in a received input signal;

combine the final decision signal of the different SAD with a preliminary decision signal of the SAD and one or both of:

a preliminary decision signal of the different SAD indicating a preliminary decision of the different SAD as to whether or not the different SAD detects activity in the input signal without the hangover addition circuit of the different SAD; or a decision signal of one or more further SADs, each further SAD being distinct from the SAD and the different SAD, and each decision signal indicating a decision of the corresponding further SAD as to whether or not the corresponding further SAD detects activity in the input signal;

send a result of the combining to a hangover addition unit of the SAD, the preliminary decision signal of the SAD indicating a preliminary decision of the SAD as to whether or not the SAD detects activity in the input signal;

generate, by the hangover addition unit of the SAD, a final decision signal of the SAD based on the result of the combining.

* * * * *